Dec. 4, 1934.  A. BODENSCHATZ  1,982,632
AUTOMATIC STOP MECHANISM
Filed Dec. 18, 1933
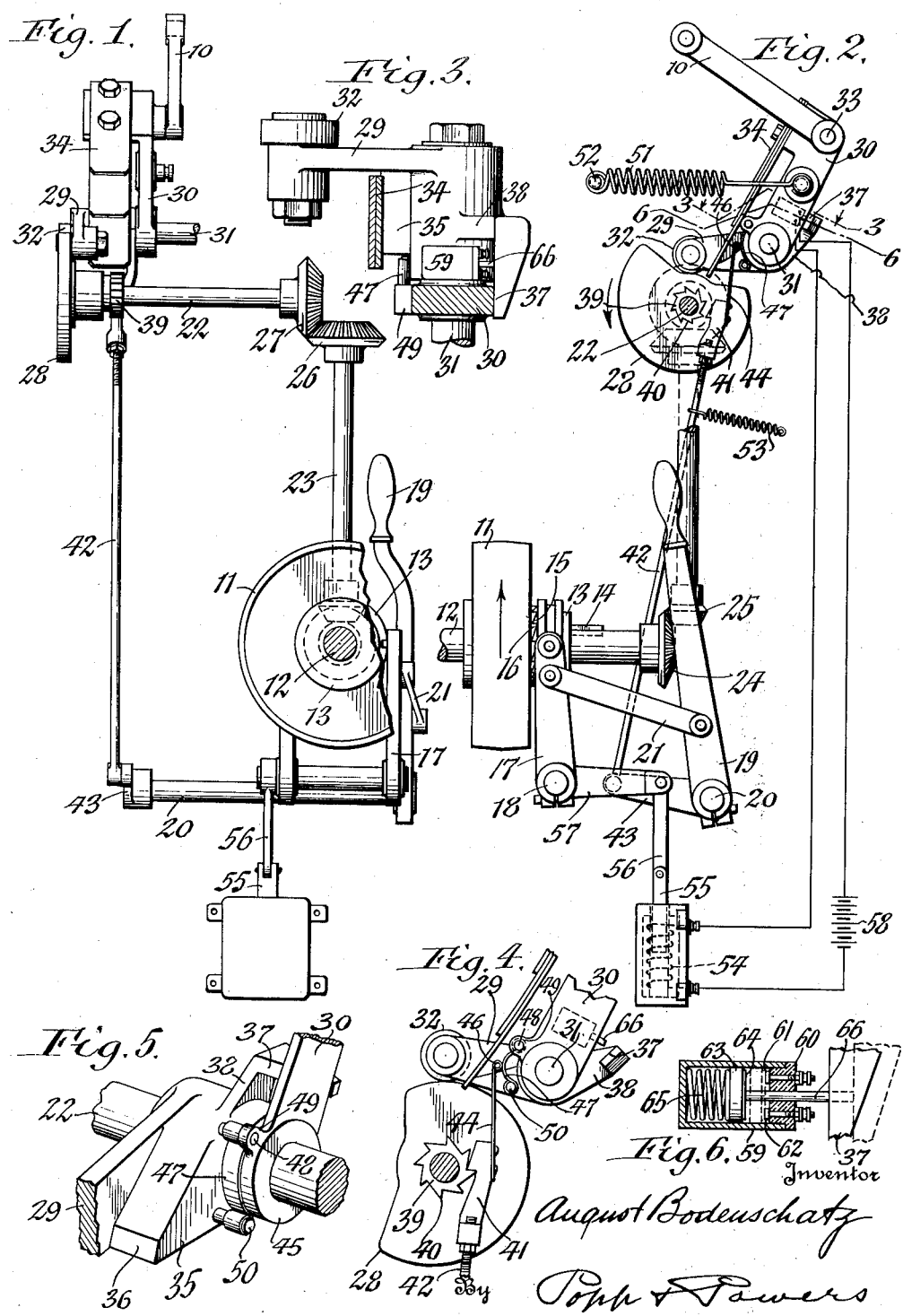

Patented Dec. 4, 1934

1,982,632

UNITED STATES PATENT OFFICE 1,982,632

AUTOMATIC STOP MECHANISM

August Bodenschatz, Philadelphia, Pa., assignor, by direct and mesne assignments, of sixty one-hundredths to Eric M. de Sherbinin, Philadelphia, Pa., twenty one-hundredths to Harold Brock Walker, Toronto, Ontario, Canada, and twenty one-hundredths to George Kroupsky, Buffalo, N. Y.

Application December 18, 1933, Serial No. 702,896

8 Claims. (Cl. 192—150)

This invention relates to an automatic stop mechanism which is more particularly intended for arresting the operation of a nut threading machine in case some part, such as the nut feeding plunger, becomes clogged or stuck for any reason, but this stop mechanism is also capable of general use in other kinds of machinery where similar conditions exist.

It is the object of this invention to provide a stop mechanism of this character which is comparatively simple in construction, positive and reliable in its operation, and not liable to get out of order.

In the accompanying drawing:

Figure 1 is a side elevation of a satisfactory embodiment of this invention.

Figure 2 is a front elevation of the same.

Figure 3 is a fragmentary horizontal section, on an enlarged scale, taken on line 3—3 Fig. 2.

Figure 4 is a fragmentary front elevation of this mechanism showing the parts in a position in which the automatic stop mechanism is in action, as compared with Fig. 2 which represents these parts in the position which they occupy when this automatic stop mechanism is not in action.

Figure 5 is a fragmentary perspectve view of parts of the mechanism embodying this improvement.

Figure 6 is a fragmentary horizontal section, on an enlarged scale, taken on line 6—6 Fig. 2.

In the following description similar characters of reference indicate like parts in the several figures of the drawing:—

Although this stop mechanism is designed more particularly for use in disconnecting any machine from the source of power in case any predetermined part of the same becomes stuck or clogged, the particular organization shown in the drawing is concerned more directly with the plunger which feeds the nut blanks from a mechanism to the threading mechanism and the driving member from which power is transmitted to the machine for operating the same.

The present drawing is therefore merely typical of one of the various uses to which this automatic stop mechanism may be put. As here shown, a working member 10 is employed which is operatively connected with the reciprocating nut blank feeder or plunger of the threading machine so that this working member moves back and forth constantly while the machine is operating normally. In the present case this working member has the form of a link which is pivotally connected at its upper end with the above-mentioned plunger.

The driving member which receives its power from any suitable source is represented in the present case by a driving pulley 11 which is rotated continuously by means of a belt passing from a prime mover such as an electric motor, steam engine or other generator of power. This pulley is mounted on a driving shaft 12 and either uncoupled from the latter so as to rotate freely thereon or coupled therewith so that this shaft is compelled to turn with the driving pulley. This may be effected by a clutch of any suitable character, such for example as the one shown in Figs. 1 and 2, which consists generally of a clutch collar or sleeve 13 which is capable of sliding on the driving shaft but compelled to turn therewith by means of a spline 14, and which is provided on one side with clutch teeth 15 adapted to move into and out of engagement with clutch teeth 16 on the driving pulley for the purpose of coupling or uncoupling this driving wheel and driving shaft in a manner well-known in this type of clutch.

The shifting of the clutch collar or sleeve 13 into and out of its operative position is effected by means of a clutch arm 17 which has its upper end connected with said clutch collar while its lower end is connected with a rocking clutch shaft 18.

Adjacent to the clutch is arranged a hand lever 19 which is connected at its lower end with a shaft 20, while its intermediate part is connected by means of a link 21 with the clutch arm 17, so that upon moving the hand lever 19 manually in one direction or the other the clutch may be coupled and uncoupled for starting and stopping the machine at will, independently of the automatic stop mechanism; such an arrangement being desirable when the operator is setting up the machine preparatory to operating the same productively.

Driving means are provided for transmitting motion from the driving shaft 12 to the working member 10 during the normal operation of the machine, which driving mechanism includes a number of elements which also form part of the automatic stop mechanism, as will presently appear. Those parts of this power transmitting mechanism which operate to transmit motion from the driving shaft to the working member are constructed and organized as follows:

The numeral 22 represents an intermediate trip shaft which is rotated constantly so long as the machine is in operation, and for this purpose the same is operatively connected with some part of the machine which is in motion while the machine is in operation. This may be accomplished in various ways and the means which are shown for this purpose are therefore merely an example of one suitable for this purpose. As there shown motion is transmitted from the driving shaft 12 to the trip shaft 22 by an upright intermediate shaft 23 which is connected at its lower end by a pair of intermeshing bevelled gears 24, 25 with the driving shaft and its upper end is connected by another pair of intermeshing bevelled gears 26, 27 with the trip shaft 22.

On this trip shaft is mounted a rotatable cam 28 which operates an intermediate transmitting lever whereby motion is transmitted from this cam to the working member 10. This transmitting lever, in its preferred construction, comprises a lower arm 29 and an upper arm 30 which have their adjacent inner ends pivotally connected by means of a shaft or pin 31 so that they turn about the same axis. The lower arm 29 is provided with a roller 32 which engages with the peripheral face of the cam 28, and the upper arm 30 is pivotally connected by means of a pin 33 with the link 10 constituting the working member of the machine. The lower and upper arms 29 and 30 of this transmitting member are capable of being turned relatively to one another for the purpose of folding and unfolding these arms, which action is utilized in effecting an automatic stoppage of this machine, as will be hereinafter described.

The unfolding of these transmitting lever arms is effected by yielding means consisting preferably of a leaf spring 34 secured to the upper arm 30 above the axis thereof and a lug 35 arranged on the lower transmitting arm and provided with a bearing face 36 which is arranged on that side of the axis of the pivotal connection between the transmitting arm which is opposite to the point of connection between the spring 34 and the upper arm 30, said bearing face being engaged by the lower or free end of this leaf spring, as best shown in Figs. 2 and 4.

The tension of this spring 34 tends constantly to move the transmitting arms 29, 30 into a straightened or unfolded position relatively to each other, and the movement of these arms in this direction is limited by means of a stop lug 37 engaging with the rear side of the upper transmitting arm 30 above the axis thereof and mounted on an upper extension 28 of the lower transmitting arm 29 which is arranged on that side of the axis of the lower arm 29 which is opposite to its cam roller 32, as shown in Figs. 2 and 4.

The numeral 39 represents a ratchet or toothed wheel which is mounted on the trip shaft 22 so as to turn with the same and with the cam 28, and provided with an annular row of peripheral teeth 40, each of which is preferably abrupt on its front side and inclined on its rear side. Adjacent to this ratchet wheel is arranged a catch, dog or pawl 41 having the form of a hook which is movable into and out of the path of the teeth of the ratchet wheel, so that when this catch is out of the path of the ratchet wheel it can remain at rest, but if the catch is moved into engagement with the teeth of the ratchet wheel, then the rotary movement of the latter will cause the catch to be moved longitudinally upward.

During normal working of the machine with which this automatic stop mechanism is associated, the catch is out of engagement from the ratchet wheel and the clutch collar is shifted, so as to couple the driving shaft with the driving wheel, but when the part with which the working member 10 is connected is interrupted in its movement due to clogging or sticking, then the catch is moved into engagement with the ratchet wheel and caused to be moved upwardly thereby, which movement operates to uncouple the clutch and thereby permit the driving shaft and the parts operatively connected therewith to come to rest while the driving pulley 10 continues to operate.

Motion from the catch to the clutch collar is transmitted at this time for accomplishing this purpose by means of a shifting rod 42 which carries the catch 41 at its upper end while the lower end of this shifting rod is connected with a shifting arm 43 connected with the hand lever shaft 20. It is therefore apparent that the parts of the manual means for coupling and uncoupling the clutch are also utilized for effecting the automatic uncoupling of the clutch.

The means whereby the catch 41 is moved into engagement with the ratchet wheel 39 are constructed as follows:

The numeral 44 represents a spring shifting finger which is secured at its lower end to the rear side of the catch 41 and projects upwardly therefrom to a point adjacent to the inner or front side of the hub 45 of the upper transmitting arm 30 where this finger is provided with a bearing point 46 which is preferably formed thereon by curling or doubling the respective part of this finger.

The numeral 47 represents a bow-shaped trip member which is preferably constructed of a strip of spring steel or other suitable metal and secured at its upper end by means of a pin 48 to a lug 49 on the upper transmitting arm 30, while its lower end is connected by means of a pin 50 to the lug 35 on the lower transmitting arm so that the points of connection between the ends of this trip member and the transmitting arms are located on opposite sides of the pivotal connection between these arms, as shown in Figs. 2, 4 and 5.

The inner or rear side of this trip member extends circumferentially around the adjacent part of the hub of the upper transmitting arm 30, and the central part of the front or outer side of this trip member engages with the bearing point 46 of the shifting finger 44. The arms of the transmitting lever and the parts associated therewith may be so organized that the roller 32 is yieldingly held in engagement with the periphery of the cam by gravity, but in the organization shown in drawing, parts of this mechanism overhang the cam and a spring 51 is employed for turning the arms of the transmitting lever in the direction for yieldingly holding the roller 32 in engagement with this cam, which spring, as shown in Fig. 2, is connected at one end with the upper transmitting arm 30 while its opposite end is connected by a pin 52 or otherwise with an adjacent stationary part of the machine.

While the machine is operating normally the catch 41 is out of engagement from the ratchet wheel 39, as shown in Fig. 2, thereby permitting the transmitting arms 29 and 30 to remain in a relatively unfolded position in which the trip member 47 will be extended to the maximum which is possible, and thus assume a position which is the nearest approach to a flattened position, whereby the central part of the bow-shaped trip spring is retracted or moved toward the axis of the transmitting lever arms, as shown in Fig. 2, and thereby permit the shifting finger 44 to move toward the axis of these transmitting arms and the catch 41 to move away from the ratchet wheel, and thus permit the operation of the machine to continue so long as normal conditions exist.

The disengagement of the catch from the ratchet wheel and the retention of the same in its inoperative position is effected in the present case by gravity, but if desired, this action may be supplemented by a spring 53 which may connect the shifting rod 42 with an adjacent stationary part of the machine, as shown in Fig. 2.

If, for any reason, the working member 10 should be held against movement due to the plunger or other part with which the same is connected being stuck or clogged so that the same cannot reciprocate, then the continued rotary motion of the cam 28 at this time will move the lower transmitting arm 29 upwardly, while the companion upper arm 30 is held at rest due to its connection by the working member 10 with the clogged part of the machine. When this lower transmitting arm moves upwardly relative to the companion arm 30, these arms are folded relatively to each other, thereby causing the bow spring 47 to be bulged outwardly at its center to a greater extent, as shown in Fig. 4, whereby the shifting finger 44 engages therewith is moved forwardly and the catch is moved inwardly into engagement with the ratchet wheel 39 so that the latter, during its rotation at this time, will cause the catch 41 to be lifted and moved lengthwise and thus uncouple the clutch and effect automatic stoppage of the rotation of the driving shaft and all the parts of the machine which are operatively connected therewith.

After the clogging of the machine has been eliminated or any other fault corrected which resulted in the interruption of the movement of the working member 10, the operator then turns the machine so as to present the low or receding part of the cam 28 to the transmitting roller 32 which permits the lower transmitting arm to again resume its unfolded position relative to its companion upper arm, and this in turn causes the bow-shaped trip spring 47 to again assume its normal position of greater straightness and the catch 41 to be disengaged from the ratchet wheel 39, as shown in Fig. 2, preparatory to resuming normal operations of the machine.

In addition to the means for mechanically transmitting the folding action of the arms 29, 30 of the transmitting lever to the clutch for uncoupling the same when the working member of the machine becomes stuck, electrical means are provided for accomplishing the same purpose. Although these electrical means may be variously organized the particular means which are shown in Figs. 1, 2 and 6 are constructed and operated as follows:

The numeral 54 represents the coil of a solenoid magnet, and 55 the core which is movable lengthwise within this coil. At its upper end this core is connected by means of a link 56 with an operating arm 57 which is connected with the clutch rock shaft 18. The circuit of this coil includes a source of electric power, such as a battery 58 and a switch, whereby this circuit is broken and the solenoid de-energized when the arms 29, 30 of the transmitting lever are unfolded into their normal position, but when these arms are folded into an abnormal position due to interruption of the movement of the working member 10, then this switch will be closed and the solenoid magnet is energized. This switch may be of any suitable and well-known form and, as best shown in Fig. 6, the same may consist of a casing 59 mounted on the upper transmitting arm 30, an insulating head 60 arranged at one end of this casing and provided with two contacts 61, 62 which form the terminals of the electric circuit of the solenoid magnet and the electric power source, a plunger 63 arranged in the casing 59 and provided with a bridge contact 64 which is movable into and out of engagement with the two terminal contacts 61, 62, a spring 65 arranged in the casing 59 between the plunger 63 and the bottom of this casing, and a shifting rod 66 sliding in the insulating head 60 and connected at its inner end with the plunger 63, while its outer end is adapted to be engaged by the stop lug 37 of the lower transmitting arm 29.

During the normal operation of the machine the upper transmitting arm 30 engages with the stop lug 37, as shown in Figs. 2 and 3, whereby the shifting rod 66 is pushed into the casing 59 and the bridge contact 64 is disengaged from the terminal contacts 61, 62 thereby breaking the circuit through the solenoid magnet and permitting the clutch to remain in its closed position in which it couples the driving pulley 11 with the driving shaft 12.

When, however, the lower transmitting arm 29 is moved upwardly into a folded position relative to the companion upper arm 30 when the working member 10 is held against movement for any reason, then the stop lug 37 is moved away from the casing 59 and the adjacent part of the upper transmitting arm 30, as shown by full lines in Fig. 4 and by dotted lines in Fig. 6, thereby permitting the bridge contact 64 to engage with the terminal contacts 61, 62 so as to close the electrical circuit through the solenoid coil 54, and as a result the core 55 thereof will be pulled downwardly and the clutch will be automatically disengaged so as to stop the further operation of the machine.

It is preferable to employ both the mechanical and the electrical means at the same time for effecting automatic stoppage of the machine, but if desired, the mechanical means may be employed exclusively in such installations where sufficient time is available to stop the machine after clogging occurs, or the electrical means may be used exclusively when the particular installation requires a very quick or prompt cutting off of the power source to the machine in the event that any interference with the movement of certain parts occurs.

As a whole, this automatic stop mechanism is comparatively simple in construction, it is also very compact and capable of being built into a machine without encroaching on the space which may be required for other mechanism, and the same can easily be maintained in an operative condition.

I claim as my invention:—

1. An automatic stop mechanism for disconnecting a normally movable working member from a power source when the movement of said member is interrupted, comprising a rotatable cam, driving means for transmitting motion from said power source to said working member and cam including a clutch for connecting and disconnecting said power source from said driving means, a rock lever having two arms which are adapted to be folded and unfolded relatively to each other and one of which is acted on by said cam and the other being operatively connected with said working member, a spring means for normally holding said arms in a relatively unfolded position, and trip means actuated by the folding action of said arms for uncoupling said clutch when the movement of said working member is arrested.

2. An automatic stop mechanism for disconnecting a normally movable working member from a power source when the movement of said member is interrupted, comprising a rotatable cam, driving means for transmitting motion from said power source to said working member and cam including a clutch for connecting and disconnecting said power source from said driving means, a rock lever having two arms which are adapted to be folded and unfolded relatively to each other and one of which is acted on by said cam and the other being operatively connected with said working member, a spring means for normally holding said arms in a relatively unfolded position, and trip means actuated by the folding action of said arms for uncoupling said clutch when the movement of said working member is arrested, said trip means including a bow shaped trip member which is bent and unbent by the relative movement of said arms.

3. An automatic stop mechanism for disconnecting a normally movable working member from a power source when the movement of said member is interrupted, comprising a rotatable cam, driving means for transmitting motion from said power source to said working member and cam including a clutch for connecting and disconnecting said power source from said driving means, a rock lever having two arms which are adapted to be folded and unfolded relatively to each other and one of which is acted on by said cam and the other being operatively connected with said working member, a spring means for normally holding said arms in a relatively unfolded position, and trip means actuated by the folding action of said arms for uncoupling said clutch when the movement of said working member is arrested, said trip means including a ratchet wheel rotatable with said cam, a catch normally arranged adjacent to said ratchet wheel and operatively connected with said clutch, and a bow-shaped trip member having its ends connected respectively with said arms and adapted to shift said catch into engagement with said ratchet wheel.

4. An automatic stop mechanism for disconnecting a normally movable working member from a power source when the movement of said member is interrupted, comprising a rotatable cam, driving means for transmitting motion from said power source to said working member and cam including a clutch for connecting and disconnecting said power source from said driving means, a rock lever having two arms which are adapted to be folded and unfolded relatively to each other and one of which is acted on by said cam and the other being operatively connected with said working member, a spring means for normally holding said arms in a relatively unfolded position, including a leaf spring connected at one end with one of said arms on one side of the axis thereof and a bearing face arranged on the other arm on the opposite side of said axis and engaged by the other end of said leaf spring and trip means actuated by the folding action of said arms for uncoupling said clutch when the movement of said working member is arrested.

5. An automatic stop mechanism for disconnecting a normally movable working member from a power source when the movement of said member is interrupted, comprising a rotatable cam, driving means for transmitting motion from said power source to said working member and cam including a clutch for connecting and disconnecting said power source from said driving means, a rock lever having two arms which are adapted to be folded and unfolded relatively to each other and one of which is acted on by said cam and the other being operatively connected with said working member, a spring means for normally holding said arms in a relatively unfolded position including a leaf spring connected at one end with one of said arms on one side of the axis thereof and a bearing face arranged on the other arm on the opposite side of said axis and engaged by the other end of said leaf spring, stop means for limiting the unfolding movement of said arms under the action of said leaf spring, and trip means actuated in response to the folding movement of said arms and operating to uncouple said clutch when the movement of said working member is interrupted.

6. An automatic stop mechanism for disconnecting a normally movable working member from a power source when the movement of said member is interrupted, comprising a rotatable cam, driving means for transmitting motion from said power source to said working member and cam including a clutch for connecting and disconnecting said power source from said driving means, a rock lever having two arms which are adapted to be folded and unfolded relatively to each other and one of which is acted on by said cam and the other being operatively connected with said working member, a spring means for normally holding said arms in a relatively unfolded position, including a leaf spring connected at one end with one of said arms on one side of the axis thereof and a bearing face arranged on the other arm on the opposite side of said axis and engaged by the other end of said leaf spring, stop means for limiting the unfolding movement of said arms under the action of said leaf spring, and trip means actuated in response to the folding movement of said arms and operating to uncouple said clutch when the movement of said working member is interrupted, said stop means consisting of an extension arranged on one of said arms and provided with a stop lug adapted to be engaged by the other of said arms on the opposite side of the axis of the latter.

7. An automatic stop mechanism for disconnecting a normally movable working member from a power source when the movement of said member is interrupted, comprising a rotatable cam, driving means for transmitting motion from said power source to said working member and cam including a clutch for connecting and disconnecting said power source from said driving means, a rock lever having two arms which are adapted to be folded and unfolded relatively to each other and one of which is acted on by said cam and the other being operatively connected with said working member, a spring means for normally holding said arms in a relatively unfolded position, including a leaf spring connected at one end with one of said arms on one side of the axis thereof and a bearing face arranged on the other arm on the opposite side of said axis and engaged by the other end of said leaf spring, and trip means actuated by the folding action of said arms for uncoupling said clutch when the movement of said working member is arrested, said trip means including a ratchet wheel rotatable with said cam, a catch arranged adjacent to said ratchet wheel and operatively connected with said clutch, a spring finger connected with said catch, and bow spring having its ends connected respectively with said arms on opposite sides of the axis thereof and adapted to be increasingly bowed by the relative movement of said arms and to engage its central part with said spring finger and move said catch into engagement with said ratchet wheel.

8. An automatic stop mechanism for disconnecting a normally movable working member from a power source when the movement of said member is interrupted, comprising a rotatable cam, driving means for transmitting motion from said power source to said working member and cam including a clutch for connecting and disconnecting said power source from said driving means, a rock lever having two arms which are adapted to be folded and unfolded relatively to each other and one of which is acted on by said cam and the other being operatively connected with said working member, a spring means for normally holding said arms in a relatively unfolded position, and trip means actuated by the folding action of said arms for uncoupling said clutch when the movement of said working member is arrested, said trip means including an electro-magnetic shifting device having a movable member operatively connected with said clutch and a switch mechanism in circuit with said shifting device and provided with contacts which are engaged and disengaged by the relative movement of said arms.

AUGUST BODENSCHATZ.